Patented Mar. 7, 1950

2,500,122

UNITED STATES PATENT OFFICE 2,500,122

EMULSIONS

James K. Dixon, Riverside, and Russell L. Morgan, Old Greenwich, Conn., assignors to American Cyanamid Company, New York, N. Y., a corporation of Maine No Drawing. Application December 20, 1947, Serial No. 793,048

8 Claims. (Cl. 252—311.5)

This invention relates to stable emulsions of water-immiscible materials and more particularly, to emulsifying agents suitable for preparing stable emulsions of water-immiscible materials in water.

It is an object of the present invention to prepare stable emulsions of water-immiscible substances.

It is another object of the present invention to prepare stable resin emulsions.

Still another object of the present invention is the preparation of stable emulsions of thermoplastic resins and stable emulsions of thermosetting resins.

A further object of the present invention is the preparation of stable emulsions of polymerizable and/or copolymerizable materials.

Still another object of the present invention is the preparation of stabilized emulsion polymers of polymerizable materials such as styrene, acrylic acid, esters of acrylic acid, homologs thereof, and the like.

A further object of the present invention is the preparation of stable wax emulsions.

Still another object of the present invention is the preparation of stable emulsions of fatty oils.

The above and other objects may be attained through the use of an emulsifying agent which is a cationic amido compound.

The invention will be described in greater detail in conjunction with the following specific examples in which proportions are given in parts by weight. The examples are merely illustrative, and it is not intended that the scope of the invention be limited to the specific details therein set forth.

*Example 1*

(1) 60 parts of nitrocellulose containing 32.3 parts of butanol
(2) 36 parts of resin A
(3) 24 parts of castor oil
(4) 111.5 parts of methyl isobutyl ketone
(5) 61.9 parts of octyl acetate
(6) 49.5 parts of toluol
(7) 24.8 parts of butanol
(8) 6.8 parts of emulsifier A (88% solids)
(9) 193.2 parts of water A mixture of (1), (2), and (3) dissolved in (4), (5), (6), and (7) is slowly added to a solution of (8) in (9) with agitation by a Lightnin' mixer, a device designed to effect very high speed localized stirring, and the resulting product is then passed twice through a Manton-Gaulin homogenizer with the first stage set at 9 and the second stage at 3.5. A resin emulsion is obtained which is stable.

*Example 2*

Example 1 is repeated, but using as the emulsifying agent only 1.1 parts of emulsifier A in 198.9 parts of water. Again a stable resin emulsion is formed.

*Example 3*

(1) 250 parts of resin B
(2) 35 parts of emulsifier A
(3) 215 parts of water (2) is dissolved in (3) by heating with steam for about 10 minutes. After cooling to about 20° C., the solution is stirred by a device designed to produce very high speed agitation as, for example, an Eppenbach Homomixer, and with the agitation device set for very high speed stirring (1) is slowly added. An emulsion forms in about 5 minutes. The emulsion has the following stability characteristics:

| Time Standing | Stability | pH | Viscosity, poises | Particle Size, microns |
|---|---|---|---|---|
| 15 hours | 8% creamed | 7.5 | 0.66 | 0.8-1 |
| 2 weeks | do | 7.5 | 0.88 | 0.5-2.4 |
| 6 weeks | 12% creamed | | | |

The term "creaming" as used in the preceding table and throughout the present specification and claims has its conventional meaning in the art. An emulsion which creams is one which separates into two layers, much as does a bottle of unhomogenized milk, but the emulsified particles do not coagulate, hence there is very little, if any, change in particle size. A creamed emulsion may therefore be readily made uniform by mere shaking and is considered to be a stable emulsion. When an emulsion separates into two layers and the emulsified particles coalesce and increase their particle size, then the emulsion has broken; it cannot be made uniform again by mere shaking, and the emulsion is unstable.

*Example 4*

(1) 250 parts of resin C
(2) 25 parts of emulsifier A
(3) 225 parts of water

In Example 3 the resin phase was added to the water phase, whereas here a reverse procedure is used. (2) is dissolved in (3) and the solution is added very slowly to (1) with high speed stirring by an Eppenbach Homomixer. The water-in-oil emulsion first formed inverts to an oil-in-water emulsion which is still stable after standing for six weeks.

*Example 5*

(1) 200 parts of resin B
(2) 8 parts of emulsifier E
(3) 192 parts of water (2) is dissolved in (3) and (1) is added to the solution slowly at room temperature, with high speed stirring by an Eppenbach Homomixer. The resulting pre-mix is passed through an homogenizer as, for example, an Abbé Impulsor, and the fluid emulsion which is formed is stable even after aging for 15 hours.

Example 6

Following the general procedures of the foregoing examples, a series of emulsions of various resins with different members of the class of emulsifiers of the present invention is prepared, and the emulsions are tested for stability with the results as tabulated below:

| Emulsifier | Material Emulsified | Stability |
|---|---|---|
| A | Resin D | good after 6 weeks. |
| A | Polystyrene | 50% creamed in 6 weeks. |
| A | Resin B | 23% creamed in 6 weeks. |
| A | Resin C | 10% creamed in 6 weeks. |
| A | Resin E | 42% creamed in 6 weeks. |
| A | Resin F | 25% creamed in 6 weeks. |
| B | Resin D | good after 6 weeks. |
| B | Polystyrene | 53% creamed in 6 weeks. |
| C | Resin C | 38% creamed in 6 weeks. |
| C | Resin B | 31% creamed in 6 weeks. |
| D | do | stable overnight. |

Example 7

(1) 192 parts of water
(2) 8 parts of emulsifier E
(3) 200 parts of resin G (3) is added slowly to a solution of (2) in (1) with high speed stirring by an Eppenbach Homomixer, after which the pre-mix is passed through an homogenizer. An emulsion is formed which is still table after 24 hours standing.

Example 8

(1) 10 parts of emulsifier A
(2) 12.5 parts of 1,1,1 trichloro-2,2-di(p-chlorophenyl) ethane
(3) 27.5 parts of xylene
(4) 200 parts of water (1), (2), and (3) are warmed together until a homogeneous phase is formed. (4) is added to the solution with agitation by means of a device designed to effect very high speed localized stirring as, for example, an Eppenbach Homomixer. A stable emulsion is formed.

Example 9

Example 8 is repeated except that the homogeneous solution of (1), (2), and (3) is added to (4) instead of the reverse. Again a stable emulsion is formed.

Example 10

(1) 250 parts of neat's-foot oil
(2) 50 parts of emulsifier A
(3) 200 parts of water The procedure of Example 3 is followed, substituting the oil for the resin, and a stable emulsion is formed.

Example 11

(1) 192 parts of water
(2) 8 parts of emulsifier E
(3) 200 parts of a mineral oil having a Saybolt viscosity of 200–210 secs. at 100° F., a minimum flash point of 350° F., an initial boiling point of 644° F., and a final boiling point of 919° F.

(3) is added slowly to a solution of (2) in (1) with high speed stirring by an Eppenbach Homomixer. An emulsion which is stable after 24 hours standing is formed.

Example 12

(1) 360 parts of paraffin wax (M. P. 134°–135° F.)
(2) 1000 parts of crude scale wax (M. P. 124°–125° F.)
(3) 240 parts of carnauba wax
(4) 200 parts of emulsifier A
(5) 2200 parts of water (1), (2), and (3) are melted together, and at 90° C. the molten mixture is poured slowly into a solution of (4) in (5) with high speed stirring by a Lightnin' mixer. The pre-mix obtained is passed through an Abbé Impulsor, and a stable fluid emulsion which is still stable after aging for one year is obtained.

The following information provides a key to the identity of the ingredients of the emulsions of the foregoing examples:

| Key Name | Chemical Identity |
|---|---|
| Emulsifier A | $C_{17}H_{35}CONH-(CH_2)_3-N^+(CH_3)_2-CH_2CH_2OH \cdot Cl^-$<br>gamma-stearamidopropyldimethyl-beta-hydroxyethyl ammonium chloride |
| Emulsifier B | $C_{11}H_{23}CONH-(CH_2)_3-N^+(CH_3)_2-CH_2CH_2OH \cdot Cl^-$<br>gamma-lauramidopropyldimethyl-beta-hydroxyethyl ammonium chloride |
| Emulsifier C | $C_{17}H_{35}CONH-(CH_2)_3-N^+(CH_3)_2-CH_2CHOHCH_2OH \cdot Cl^-$<br>gamma-stearamidopropyldimethylglyceryl ammonium chloride |
| Emulsifier D | $C_{17}H_{33}CONH-(CH_2)_3-N^+(CH_3)_2-CH_2CH_2OH \cdot Cl^-$<br>gamma-oleylamidopropyldimethyl-beta-hydroxyethyl ammonium chloride |
| Emulsifier E | $C_{17}H_{35}CONH(CH_2)_3-N^+(CH_3)_2-(CH_2CH_2O)_x-CH_2CH_2OH \cdot Cl^-$<br>reaction product of gamma-stearamidopropyldimethyl ammonium chloride with 20 moles of ethylene oxide |

Resins emulsified

Resin A is an alkyd resin prepared from phthalic anhydride, adipic acid, castor oil, and ethylene glycol.

Resin B is a butylated melamine-formaldehyde condensation product, the relative molar proportions of melamine and formaldehyde being 1:5.

Resin C is a butylated urea-formaldehyde lacquer solution.

Resin D is an alkyd resin prepared from phthalic anhydride, glycerine, linseed oil, soya bean oil, and castor oil.

Resin E is an alkyd resin prepared from phthalic anhydride, glycerine, and benzoic acid.

Resin F is an alkyd resin prepared from phthalic anhydride, fumaric acid, glycerine, and castor oil.

Resin G is a long oil length rosin-fumaric acid adduct.

Emulsifying agents which constitute the present invention, and which are therefore useful in the preparation of stable emulsions of water-immiscible materials, may be represented by the following general formula:

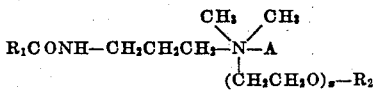

In the above formula, $R_1$ may be any saturated or unsaturated aliphatic hydrocarbon radical containing from 11 to 17 carbon atoms, $R_2$ may be a hydroxylated saturated aliphatic hydrocarbon radical of 2 or 3 carbon atoms, and $x$ may be zero or a whole number. A is an anion such as chloride, acetate, etc.

$R_1$ in the above formula may be stearyl, oleyl, lauryl, linoleyl, palmityl, linolenyl, myristyl, tridecylyl, pentadecylyl, margaryl, etc.

Suitable hydroxylated saturated aliphatic hydrocarbon radicals, i. e., $R_2$ in the above general formula, include hydroxyalkyl groups such as hydroxymethyl, beta-hydroxyethyl, beta-hydroxypropyl, etc., as well as polyhydroxyalkyl such as glyceryl. $x$ may be zero or any whole number, the preferred range covering zero and anything up to 100.

A in the formula may be any suitable anion such as chloride or bromide, acetate, propionate, sulfate, phosphate, etc.

Emulsifying agents of the present invention may be prepared in general by quaternizing a tertiary amine of the general formula:

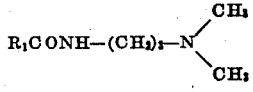

with an ethylene halohydrin or a glycerol halohydrin such as ethylene chlorohydrin, epichlorohydrin, alpha-chlorohydrin, and the like, alone or in conjunction with ethylene oxide if an emulsifier of the type of emulsifier E is desired. Salts other than the chloride or bromide may be prepared by treating the tertiary amine with ethylene oxide and an acid, the salt of which is desired, instead of with an ethylene halohydrin. They may also be prepared from the corresponding chloride or bromide by anion interchange. For example, reaction between gamma-stearamidopropyldimethyl - beta - hydroxyethyl ammonium chloride with silver nitrate in water solution will result in precipitation of silver chloride and production of the corresponding nitrate. When the silver salt of the desired anion is not sufficiently soluble in water, a similar reaction may be brought about in alcoholic solution between a quaternary ammonium chloride, for example, and the potassium salt of the desired anion, potassium chloride precipitating out of the alcohol. Solubility considerations, therefore, will determine the method of preparation chosen.

Stable emulsions of a wide variety of substances may be prepared using the amido cationic emulsifying agents of the present invention. Thermosetting resins which may be emulsified according to the present invention include phenol-aldehyde, cresol- and other alkyl phenol-aldehyde condensation products, aldehyde condensation products of urea, methylol urea, methylated urea, and other alkylatedureas obtained by condensing urea with a saturated aliphatic alcohol and formaldehyde, aldehyde condensation products of melamine and alkylated melamines as described in U. S. Patent No. 2,197,357, alkyd resins, copolymers of vinyl compounds with unsaturated alkyd resins such as described in the Ellis Patent No. 2,255,313, and the like. Thermoplastic resins which may also be emulsified by means of the emulsifying agents of the present invention include polyvinyl compounds such as polystyrene, copolymers of different type vinyl compounds such as vinyl chloride and vinyl acetate, thermoplastic phenol-formaldehyde resins such as phenol-acetaldehyde and phenol-furfural resins, esters of rosin with polyhydric alcohols such as glycerol, penta-erythritol, etc.

Stable emulsions of a wide variety of waxes may be prepared using the emulsifying agents of the present invention. Examples of such waxes include paraffin waxes, carnauba wax, montan wax, candelilla wax, beeswax, and the like.

Stable emulsions of a wide variety of miscellaneous water-immiscible materials other than those classed as resins or waxes may be prepared using the emulsifying agents of the present invention. Mineral oil, fatty oils, such as neat's-foot oil, cocoanut oil, rapeseed oil, China-wood oil, peanut oil, and the like, organic solvents, etc., may be emulsified according to the present invention.

The present invention is not limited to the use of any particular proportion of emulsifying agent or to the use of solutions of any particular concentration. In general, we prefer using about 5% to 10% of the emulsifying agent based on the weight of the material to be emulsified, but commercially attractive stable emulsions may be obtained if this figure is varied from about 0.1% to about 25%. The optimum concentration varies, depending primarily upon the material to be emulsified although other factors such as speed and kind of agitation have their effect, too. Thus, the highest proportion may not be the optimum; acid alkyd resins, for example, require relatively less emulsifying agent.

The present invention is not limited to any particular method of preparation of the resin emulsions. Direct addition of the oil phase, which comprises the water-immiscible material, to the water phase is a satisfactory method of producing the emulsions. However, the emulsions may also be prepared by the inversion method, according to which the water phase is added to the water-immiscible substance. The emulsifying agent is usually added to the water phase since it is likely not to be soluble in the oil phase. However, if the emulsifier is soluble in the oil phase as may be the case, for example, when an acetate salt is used to emulsify certain waxes or hydrophilic resins, then the reverse procedure may be used and the emulsifying agent added to the oil phase.

Any method of providing rapid agitation during the period of addition may be used. For example, any commercial colloid mill homogenizer or high speed stirring device effecting thorough localized mixing at the point of addition of the oil and water phases may be used to stabilize the emulsion. Moreover, in certain cases as, for example, the emulsification of 1,1,1-trichloro-2,2-di(p-chlorophenyl)ethane in xylene, mere hand stirring is sufficient for production of a stable emulsion.

The emulsions prepared according to the present invention, and particularly the resin emulsions so prepared, may have pigments or dyes incorporated therein. For example, they may be colored by the addition of carbon black, iron blue, chrome yellow, lithopone, etc. Similarly, if desired, various plasticizers and/or thickeners such as water-soluble methylated cellulose ethers may also be added.

Resin emulsions prepared according to the present invention, either pigmented or unpigmented, find wide application in paints, lacquers, and varnishes. They may also be used to coat and/or impregnate leather, textiles, paper, and other fibrous cellulosic materials. With respect to the application of the emulsions of the present invention in surface coating or textile treating compositions, a great advantage of the new emulsion is apparent. In the past, primary, secondary, or tertiary amines have been used in the preparation of resin emulsions. These amines tend to discolor textiles or coatings during the curing of the resin, or they may actually inhibit the cure of the resin. The quaternary ammonium compounds which are the emulsifying agents of the present invention do not have these objectionable properties.

In the present specification and claims, the term "stable" is used to describe an emulsion which shows, over an aging period of from 12 to 18 hours, no irreversible separation due to growth in the size of the emulsified particles as a result of coagulation or coalescence. A creamed emulsion is a stable emulsion since, as already set forth, the separation is not irreversible and little or no change in particle size is involved. Most of the emulsions of the present invention show no irreversible separation over an aging period of considerably longer than the 12 to 18 hours.

What is claimed is:

1. An emulsion of a water-immiscible material in water comprising a water-immiscible material, water, and, as an emulsifying agent therefor, from about 0.1% to about 25% by weight, based on the weight of water-immiscible material, of a compound represented by the formula

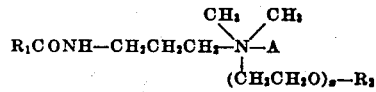

in which $R_1$ is an aliphatic hydrocarbon radical of from 11 to 17 carbon atoms, $R_2$ is a hydroxylated saturated aliphatic hydrocarbon radical of from 2 to 3 carbon atoms, $x$ is selected from the group consisting of zero and whole numbers, and A is an anion.

2. A resin emulsion comprising a water-immiscible resin and water, and, as an emulsifying agent therefor, from about 0.1% to about 25% by weight, based on the weight of water-immiscible resin, of a compound represented by the formula

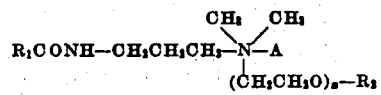

in which $R_1$ is an aliphatic hydrocarbon radical of from 11 to 17 carbon atoms, $R_2$ is a hydroxylated saturated aliphatic hydrocarbon radical of from 2 to 3 carbon atoms, $x$ is selected from the group consisting of zero and whole numbers, and A is an anion.

3. A wax emulsion comprising a water-immiscible wax, water, and, as an emulsifying agent therefor, from about 0.1% to about 25% by weight, based on the weight of water-immiscible wax, of a compound represented by the formula

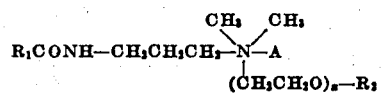

in which $R_1$ is an aliphatic hydrocarbon radical of from 11 to 17 carbon atoms, $R_2$ is a hydroxylated saturated aliphatic hydrocarbon radical of from 2 to 3 carbon atoms, $x$ is selected from the group consisting of zero and whole numbers, and A is an anion.

4. An oil emulsion comprising a water-immiscible oil, water, and, as an emulsifying agent therefor, from about 0.1% to about 25% by weight, based on the weight of water-immiscible oil, of a compound represented by the formula

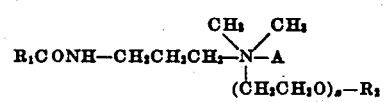

in which $R_1$ is an aliphatic hydrocarbon radical of from 11 to 17 carbon atoms, $R_2$ is a hydroxylated saturated aliphatic hydrocarbon radical of from 2 to 3 carbon atoms, $x$ is selected from the group consisting of zero and whole numbers, and A is an anion.

5. An emulsion of a water-immiscible material in water comprising a water-immiscible material, water, and, as an emulsifying agent therefor, from about 0.1% to about 25% by weight, based on the weight of water-immiscible material, of gamma - stearamidopropyldimethyl - beta - hydroxyethyl ammonium chloride having the formula

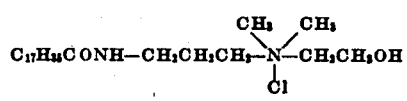

6. An emulsion of a water-immiscible material in water comprising a water-immiscible material, water, and, as an emulsifying agent therefor, from about 0.1% to about 25% by weight, based on the weight of water-immiscible material, of gamma - stearamidopropyldimethylglyceryl ammonium chloride having the formula

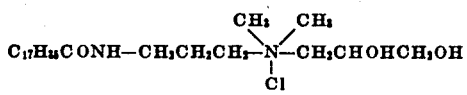

7. An emulsion of a water-immiscible material in water comprising a water-immiscible material, water, and, as an emulsifying agent therefor, from about 0.1% to about 25% by weight, based on the weight of water-immiscible material, of a compound of the formula

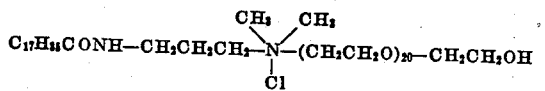

8. An emulsion as in claim 1 in which about 5% to 10%, based on the weight of water-immiscible material to be emulsified, of the emulsifying agent is used.

JAMES K. DIXON.
RUSSELL L. MORGAN.

REFERENCES CITED

The following references are of record in the file of this patent:

UNITED STATES PATENTS

| Number | Name | Date |
|---|---|---|
| 2,239,706 | Epstein | Apr. 29, 1941 |
| 2,268,395 | Henke | Dec. 30, 1941 |
| 2,282,702 | Bock | May 12, 1942 |
| 2,418,652 | Maxwell | Apr. 8, 1947 |